United States Patent [19]
Yap et al.

[11] Patent Number: 6,037,398
[45] Date of Patent: Mar. 14, 2000

[54] SBR-SBS MODIFIED ASPHALT ROOFING COMPOSITIONS ESPECIALLY ADAPTED FOR COLD APPLICATION

[75] Inventors: Michael L. Yap, Oldsmar; Raymond T. Hyer; Barton J. Malina, both of Tampa, all of Fla.

[73] Assignee: Gardner Asphalt Corporation, Tampa, Fla.

[21] Appl. No.: 09/047,245

[22] Filed: Mar. 24, 1998

[51] Int. Cl.[7] .................... C08J 5/10; C08K 3/08; C08L 25/10
[52] U.S. Cl. .................. 524/441; 523/172; 524/62; 524/64; 524/71
[58] Field of Search ................ 523/172; 524/62, 524/63, 64, 65, 66, 69, 71, 441

[56] References Cited

U.S. PATENT DOCUMENTS 4,196,115  4/1980  Bresson .................. 260/28.5 B
5,198,042  3/1993  Masumoto et al. ............ 148/403

Primary Examiner—James J. Seidleck
Assistant Examiner—U. K Rajguru
Attorney, Agent, or Firm—Stein, Schifino & Van Der Wall

[57] ABSTRACT

SBR-SBS modified asphalt and aluminum compositions are especially adapted for cold application to roofs while providing more UV protection.

2 Claims, No Drawings

SBR-SBS MODIFIED ASPHALT ROOFING COMPOSITIONS ESPECIALLY ADAPTED FOR COLD APPLICATION

BACKGROUND OF THE INVENTION

1. Field of the Invention

Use of asphalt and blends thereof, with elastomers for roofing applications is well known, see e.g., U.S. Pat. No. 4,196,115. The advantage of cold applicability on flat roofs so as to avoid working with a hot material at a job site is also well known, see e.g., U.S. Pat. No. 4,609,696.

It is desirable to protect roof surfaces against the sun's destructive rays particularly UV, and weathering.

2. Prior Art

U.S. Pat. No. 4,196,115 discloses blends of asphalt and various copolymers in roofing formulations for desirable low temperature properties. U.S. Pat. No. 4,609,696 discloses asphalt, rubber emulsions containing various solvents, to decrease viscosity, making the formulations sprayable at ambient conditions.

Various elastomer modified asphalt aluminum formulations have been developed in an effort to achieve improved reflectivity, plasticity, and coating compatibility with roofing membranes containing SBS rubber among others.

SUMMARY OF THE INVENTION

It has now been found that roofing compositions, especially adapted for cold application, consisting essentially of an asphalt, modified with SBR or SBS rubber, or both, and aluminum, provide greatly improved reflective and weathering properties and ease of application.

DETAILED DESCRIPTION OF THE INVENTION

The asphalt employed in this invention can be of any of the well known bituminous substances derived from a number of materials such as, for example, petroleum, shale oil, tar and the like. Asphalt is a thick, viscous mixture of compounds such as, for example, paraffinic, cycloaliphatic and aromatic hydrocarbons and lesser amounts of heterocyclic compounds containing sulfur, nitrogen or oxygen. Although asphalt can be obtained from natural sources it is primarily derived as the residue of petroleum distillation (e.g. the bottom product of a vacuum distillation of a topped crude). Although this invention is not limited thereto, it is presently preferred that the asphalt have a penetration (ASTM D5) at 77 degrees F. dmm: ranging from about 30 to about 300 dmm and more preferably from about 50 to about 200 dmm and conform in general to specifications outlined by ASTM D312, D946 and/or D449.

The asphalt is utilized in an amount of about 10 to 90 parts by weight percent of the total composition with a preferred range of about 20 to 50.

About 15–50 parts by weight solvent are employed. Preferably, the solvent is selected from the group consisting of petroleum distillates and mixtures thereof.

The elastomer utilized is SBR, or SBS or both. The SBR contains about 10 to 50 weight percent styrene. The SBS contains about 5 to 50 weight percent styrene. The molecular weight of each are in the range of about 10,000 to 100,000. The elastomer is used in the total composition in an amount of about 0.5 to 5.0 parts by weight percent, preferably 0.5 to 2.0. When both are used the total amount is the same.

The aluminum utilized is the so called leafing aluminum ASTM D-962. The diameter particle size is in the range of about 10 to 100, preferably 40 to 60 microns. The aluminum is utilized in an amount of from about 1 to 40, preferably 5 to 20, parts by weight percent of the total composition.

Inert fillers such as clay, pulverized limestone powder, talc, perlite etc., can be used in an amount of about 0 to 50, and preferably 10–30 weight percent.

Inert fibers such as cellulosic, asbestos, fiberglass, polyolefin, etc. can be used in an amount of from about 0–25, and preferably 0–10 weight percent.

The method of formulation of the aluminum dispersion in the SBR, SBS modified asphalt is as follows: Aluminum in a paste with the indicated solvents above, is admixed thoroughly with the asphalt, preferably at ambient temperature. Fibers and fillers are then added with further mixing. The final composition is characterized by a viscosity of about 500–10,000, preferably 2000–6000 centipoise at, 25 degrees C.

The method of application to the roof is well known and need not be elaborated here. The usual range of application of the finished composition is in the range of about 30–300 sq. ft./per gallon for each coat of composition.

What is indeed surprising is the extremely high reflectivity obtained by this invention through the use of the modified asphalts with the amounts of aluminum i.e. a minimum of about 25%, ASTM D2824, Section 8.6.

The invention will be better understood by reference to the following examples.

Various compositions of this invention were prepared conforming to the following examples.

|  | % |
|---|---|
| EXAMPLE I | |
| Petroleum Distillate | 32 |
| Aluminum | 2 |
| SBR Modified Asphalt | 33 |
| Cellulose Fiber | 3 |
| Inert Fillers | 30 |
| TOTAL | 100 |
| EXAMPLE II | |
| Petroleum Distillate | 36 |
| Aluminum | 20 |
| SER Modified Asphalt | 31 |
| Cellulose Fiber | 3 |
| Inert Fillers | 10 |
| TOTAL | 100 |
| EXAMPLE III | |
| Petroleum Distillate | 32 |
| Aluminum | 2 |
| SBS Modified Asphalt | 33 |
| Cellulose Fiber | 3 |
| Inert Fillers | 30 |
| TOTAL | 100 |
| EXAMPLE IV | |
| Petroleum Distillate | 36 |
| Aluminum | 20 |
| SBR Modified Asphalt | 31 |
| Cellulose Fiber | 3 |
| Inert Fillers | 10 |
| TOTAL | 100 |

-continued

| | % |
|---|---|
| EXAMPLE V | |
| Petroleum Distillate | 32 |
| Aluminum | 2 |
| SBS/SBR Modified Asphalt | 33 |
| Cellulose Fiber | 3 |
| Inert Fillers | 30 |
| TOTAL | 100 |
| EXAMPLE VI | |
| Petroleum Distillate | 36 |
| Aluminum | 20 |
| SBS/SBR Blend Modified Asphalt | 31 |
| Cellulose Fiber | 3 |
| Inert Fillers | 10 |
| TOTAL | 100 |

All of the examples had viscosities in the range of 2000–6000 centipoise, and when applied gave reflectivities of 40–80.

The advantages of this invention will be apparent to those skilled in the art from the foregoing. i.e. high reflectivity, decreased costs, and improved weathering and thermal shock, among others.

It is to be understood that this invention is not limited to the specific examples which have been offered as particular embodiments and that modifications can be made without departing from the spirit thereof.

Now that the invention has been described, What is claimed is:

1. A roofing composition especially adapted for cold application consisting of:

| | Parts by Weight % |
|---|---|
| Asphalt | 20–70 |
| At least one of styrene butadiene rubber; or styrene butadiene styrene rubber | 0.5–5 |
| Aluminum particles | 1–30 |
| petroleum distillate solvent | 15–50 |
| Inert filler | 0–30 |
| Inert fiber | 0–10 | the composition having a viscosity in the range of about 500–10,000 centipoise at 25° C.

2. The composition of claim 1 consisting of the following components:

| | Parts by Weight % |
|---|---|
| Asphalt | 20–50 |
| At least one of styrene butadiene rubber; or styrene butadiene styrene rubber | 0.5–2 |
| Aluminum particles | 5–20 |
| petroleum distillate solvent | 15–50 |
| Inert filler | 10–30 |
| Inert fiber | 0–10 |

* * * * *